United States Patent [19]
Iizuka

[11] Patent Number: 6,075,619
[45] Date of Patent: Jun. 13, 2000

[54] IMAGE PROCESSING APPARATUS AND METHOD

[75] Inventor: Yoshio Iizuka, Tokyo, Japan

[73] Assignee: Canon Kabushiki Kaisha, Tokyo, Japan

[21] Appl. No.: 08/972,176

[22] Filed: Nov. 18, 1997

Related U.S. Application Data

[63] Continuation of application No. 08/628,006, Apr. 4, 1996, which is a continuation of application No. 08/252,582, May 31, 1994.

[30] Foreign Application Priority Data

May 31, 1993 [JP] Japan .................................. 5-129584
Oct. 7, 1993 [JP] Japan .................................. 5-251412
May 26, 1994 [JP] Japan .................................. 6-112803

[51] Int. Cl.$^7$ .................................................. H04N 1/415
[52] U.S. Cl. ......................... 358/432; 358/539; 382/166; 382/232; 382/251
[58] Field of Search ...................... 358/433, 432, 358/430, 426, 539; 348/438, 440, 445; 382/162, 166, 232, 239, 251

[56] References Cited

U.S. PATENT DOCUMENTS 5,150,432  9/1992  Ueno et al. .............................. 348/438
5,383,037  1/1995  Kimura et al. ........................... 358/433
5,588,069  12/1996  Katayama et al. ....................... 358/539

*Primary Examiner*—Thomas D. Lee
*Attorney, Agent, or Firm*—Fitzpatrick Cella Harper & Scinto

[57] ABSTRACT

An image encoding apparatus, as well as a method, which can suppress degradation of image quality in the image region which contains a predetermined color. The apparatus has a block data acquisition unit which divides inputted color image signal into plurality of block data, a specific color proportion measuring unit which measures proportion of the specific color in block data inputted thereto so as to produce a specific color proportion information signal, an orthogonal transformation unit which performs orthogonal transformation of block data as to output a transform coefficients, and a quantization unit which quantizes the inputted transform coefficients in accordance with the specific color proportion information signal so as to produce quantized data. The quantized data is then encoded into variable-length codes, whereby compressed data is obtained.

27 Claims, 7 Drawing Sheets

IMAGE PROCESSING APPARATUS AND METHOD

This application is a continuation of application Ser. No. 08/628,006 filed Apr. 4, 1996, which is a continuation of application Ser. No. 08/252,582 filed on May 31, 1994.

BACKGROUND OF THE INVENTION

1. Field of the Invention

The present invention relates to an image processing apparatus, as well as to an image processing method, and more particularly to image processing apparatus and method which can effectively suppress degradation of image quality at an image region which contains a predetermined color.

2. Description of the Related Art

ISO/IEC DIS (Draft International Standard) 10918-1 and ITu-T recommendation T.81 have been determined as standard methods for encoding and decoding still picture. These standards are the same in the contents and are collectively referred to as "JPEG Standards" in accordance with the practice in the field concerned.

According to JPEG standards, color image signals are subjected to discrete cosine transform (referred to as "DCT", hereinafter) on block basis, and the transform coefficients of DCT are quantized with variable stepsize so as to encode the quantized data into codes of variable lengths, thus achieving compression of the amounts of the codes. In this process, the quantization stepsize is controlled in accordance with one of a plurality of predetermined quantization tables. The variable-length codes used in the encoding are determined in accordance with a pair of encoding tables which are selected from groups of encoding tables given for D.C. and A.C. components of the DCT coefficients.

It is to be noted, however, JPEG standards do not pose any restriction in regard to the reference for the selection of quantization and encoding tables and the manners in which the contents of both types of tables are determined.

This known technique has suffered from the following problem. The compression ratio in the image encoding method following JPEG standards or similar to the same relies upon the reference for the selection of the quantization table and the pair of encoding tables and upon the content of each quantization table and each encoding table. In other words, the compression ratio is ruled by the manner of determination of the quantization stepsizes and the variable-length codes.

Variable-length codes optimum for improving the compression ratio can be determined by examining the statistical distribution of the quantized data obtained through quantization of the DCT coefficients. By optimizing the variable-length codes, it is possible to improve to a certain degree the compression ratio without being accompanied by degradation of the quality of the reconstructed image. This method, however, cannot provide a remarkable increase in the compression ratio.

Obviously, the greater the quantization stepsizes, the greater the compression ratio. Increases in the quantization stepsizes, however, cause a degradation in the quality of the reconstructed image. It is therefore necessary that the quantization stepsizes are determined so as to achieve the required compression ratio without causing any noticeable degradation of the image quality.

ITu-T recommendation H. 261 has been enacted to provide standards for methods of encoding and decoding moving picture components for audio and video services such as those for videophone, video cnnferencing system, or the like. According to ITu-T recommendation H. 261, encoding at a very high compression ratio is realized thanks to the use of variable quantization stepsize and the use of variable-length coding. In addition, a constant transmission rate is attained by the use of a transmission buffer.

In order to realize a constant transmission rate, it has been proposed to feedback the amount of data in the transmission buffer as control information, so as to vary the quantization stepsize in accordance with the amount in the transmission buffer. According to this method, when there is a risk of overflow of the transmission buffer due to an increase in the amount of data, the quantization stepsize is increased so as to suppress generation of transmitted data, whereas, when there is a risk of under-flow of the buffer due to decrease in the amount of data, quantization stepsize is reduced so as to promote generation of the data to be transmitted.

In general, however, in the known moving picture signal encoding apparatus of the type described, the quantization stepsize is set to comparatively large value as an average when the transmission rate is low, so that defect or degradation of image such as block distortion tends to be caused in the reconstructed image.

SUMMARY OF THE INVENTION

The present invention is aimed at overcoming the above-described problems of the known art.

It is an object of the present invention to provide an image processing apparatus, as well as a method, which enables efficient encoding in accordance with the quantity of pixels having a predetermined color, while suppressing degradation in the image quality.

To this end, according to one aspect of the present invention, there is provided an image processing apparatus comprising: input means for inputting image data; dividing means for dividing the image data into a plurality of blocks, each having a plurality of pixels; detecting means for detecting amount of pixels having a predetermined color in said block; and encoding means for encoding the image data in accordance with the result of detection performed by said detecting means.

Another object of the present invention is to provide an image processing apparatus, as well as a method, which enables efficient encoding of a moving picture component while suppressing degradation of the image quality.

A still further object of the present invention is to provide an improved method of determining the quantization stepsize.

It is a further object of the present invention to provide an image processing apparatus, as well as a method, capable of providing reconstructed image quality which can be evaluated more highly by those who view the reconstructed image.

The above and other objects, features and advantages of the present invention will become clear from the following description of the preferred embodiments when the same is read in conjunction with the accompanying drawings.

DESCRIPTION OF THE PREFERRED EMBODIMENTS

First Embodiment

A first embodiment of the image processing apparatus in accordance with the present invention will be described in detail with reference to the drawings.

Figure 1:
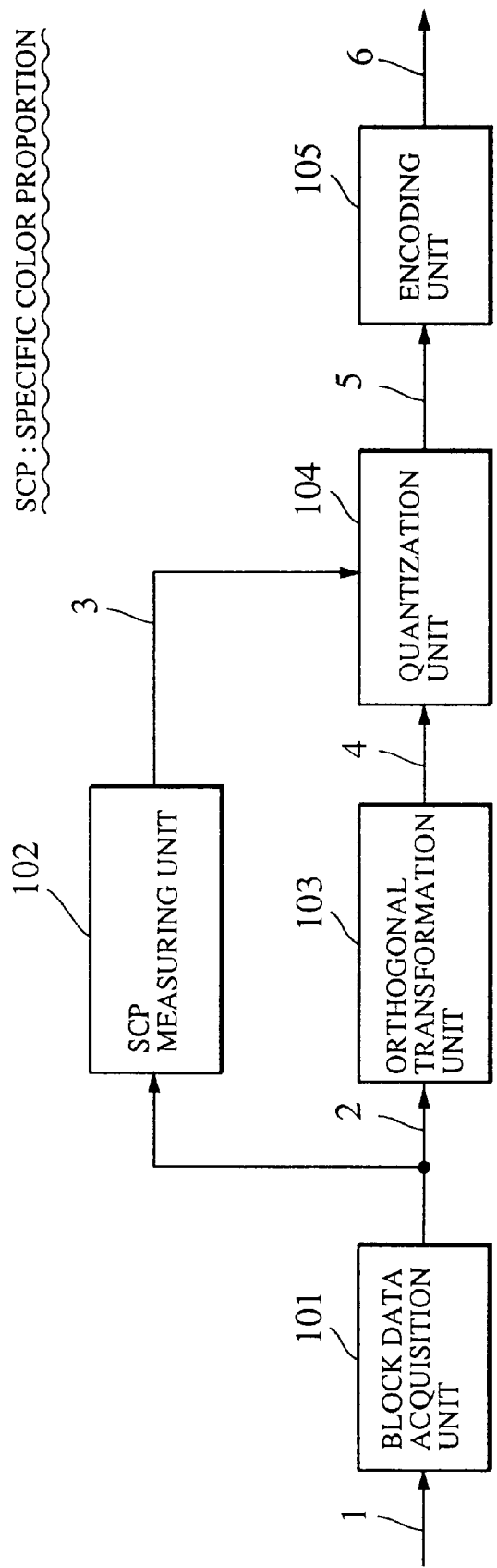
FIG. 1 is a block diagram showing the basic construction of an embodiment of the image processing apparatus in accordance with the present invention.

As shown in FIG. 1 which is a block diagram showing the basic construction of the first embodiment, the image processing apparatus of this embodiment has a block data acquisition unit 101 which divides color image signals inputted through, for example, a computer or an image scanner into block data of, for example, 8×8 pixel size. The block data 2 is assumed here to have N pixels, from first pixel to N-th pixel. The color image signal 1 can be represented with any suitable set of color components. The first embodiment also can use any suitable set of color components. In the following description, however, it is assumed that the color image signal 1 is represented by luminance signal Y and color difference signals Cb, Cr.

A specific color proportion (scp) measuring unit 102 may include a processor such as a digital signal processor and measures proportion of a specific color in the block data inputted thereto, so as to produce a specific color proportion (scp) information signal 3. The term "specific color proportion" is used to mean the proportion of pixels contained in a predetermined color space region within each block.

An orthogonal transform unit 103 performs orthogonal transformation of each inputted block data 2 and produces transform coefficients 4.

A quantization unit 104 performs in accordance with the specific color proportion (scp) information signal 3, quantization of the transform coefficients 4 inputted thereto and produces quantized data 5.

An encoding unit 105 performs encoding in zig-zag scan order of the quantized data 5 inputted thereto into variable-length codes 6 that are namely compressed data.

Figure 2:
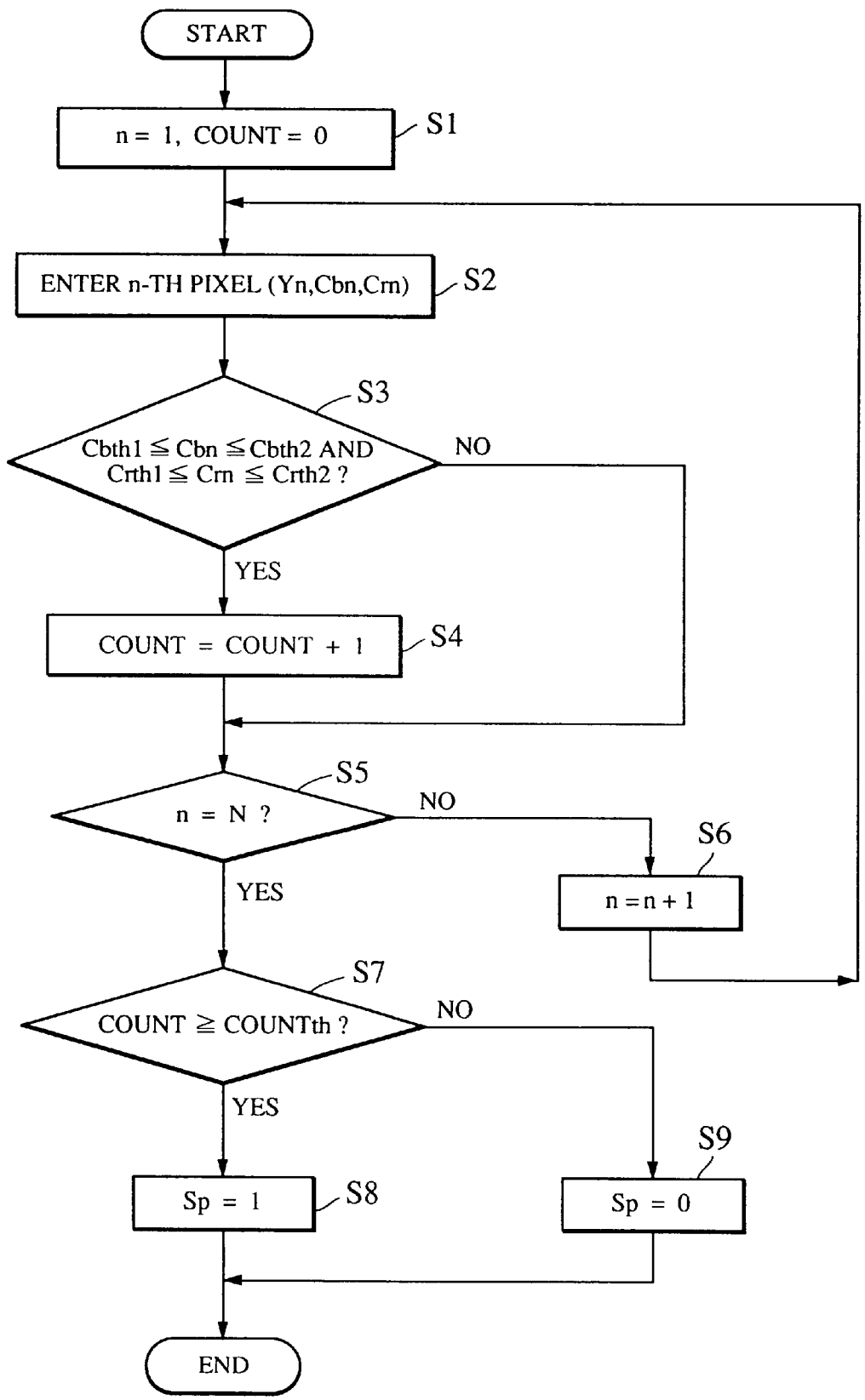
FIG. 2 is a flow chart illustrative of a processing flow performed by a specific color proportion (scp) measuring unit in the embodiment shown in FIG. 1.

FIG. 2 is a flow chart showing a process performed by the specific color proportion (scp) measuring unit 102 for each of the block data of image. The following symbols are used in this flow chart.

n: pixel number in the block

Yn: luminance signal Y of n-th pixel

Cbn: color difference signal Cb of n-th pixel

Crn: color difference signal Cr of n-th pixel

Cbth1: threshold value 1 of color difference signal Cb

Cbth2: threshold value 2 of color difference signal Cb
wherein Cbth1≦Cbth2

Crth1: threshold value 1 of color difference signal Cr

Crth2: threshold value 2 of color difference signal Cr
wherein Crth1≦Crth2

COUNT: counter for measuring proportion of specific color

COUNTth: threshold value of the counter for measuring proportion of specific color Sp: specific color proportion (scp) information signal 3.

It is assumed that the values of Cbth1, Cbth2, Crth1, Crth2 and COUNTth have been determined beforehand.

Referring to FIG. 2, the specific color proportion (scp) measuring unit 102 initializes n to 1 and COUNT to 0 in Step S1.

In Step S2, n-th pixel is inputted and, in Step S3, a determination is made as to whether Cbn and Crn respectively fall within predetermined ranges (Cbth1≦Cbn≦Cbth2, Crth1≦Crn≦Crth2). When Cbn and Crn fall within the above-mentioned ranges, the process proceeds to Step S4 which increments COUNT by 1.

In a subsequent Step S5, a determination is made as to whether processing has been finished for all the pixels in one block. If not (n≦N), the process proceeds to Step S6 in which n is incremented be 1. The process then returns to Step S2. Conversely, when the processing has been finished for all the pixels in the block (n=N), Step S7 is executed to determine whether the proportion of the specific color is not less than a predetermined value. When the proportion of the specific color is not less than a predetermined value (COUNT≧COUNTth), the process proceeds to Step S8 in which Sp="1" is outputted, whereas, if the proportion of the specific color is less than the predetermined value (COUNT>COUNTth), the process proceeds to Step S9 in which sp="0" is outputted, thus completing processing on this block.

The quantization unit 104 has at least two types of quantization tables TQY1, TQY2 for luminance signal Y, as well as at least two types of quantization tables TQC1, TQC2 for color difference signals Cb, Cr. The quantization Stepsizes described in the quantization table TQY1 are generally smaller than those described in the quantization table TQY2. Similarly, the quantization stepsizes described in the quantization table TQC1 are generally smaller than those described in the quantization table TQC2. The quantization unit 104 is executed by employing the quantization tables TQY1 and TQC1 when the received specific color proportion information signal 3, i.e., Sp shown in FIG. 2, is "1", whereas, when the signal 3 is "0", the quantization tables TQY2 and TQC2 are used.

When a block has a large value of proportion of a specific color, Sp is set to "1". In this case, quantization tables TQY1 and TQC1 having small stepsizes are used so as to suppress degradation of the quality at the block of reconstructed image. Conversely, when the block has a small value of proportion of the specific color, Sp is set to "0". In this case, quantization tables TQY2 and TQC2 having comparatively large stepsizes are used to increase the compression ratio of the block.

As will be understood from the foregoing description, in this embodiment, the quantization stepsizes are varied in accordance with the proportion of pixels which are contained in a predetermined color space region. Therefore, degradation of the quality of the reconstructed image is suppressed in blocks in which the proportion of the specific color is large, whereas, in blocks in which the proportion of the specific color is small, the compression ratio of the blocks is increased. For instance, when a color picture containing a person against a background is encoded, the image of the person, e.g., the face, can be encoded without being accompanied by degradation in the image quality, while the background is encoded with large compression ratio, provided that the color of the face skin is determined as the specific color.

The specific color proportion information signal 3 is shown as a binary signal in the foregoing description and in FIG. 2. This, however, is not exclusive and the specific color proportion information signal 3 may be a multi-value signal indicative of the proportion of the specific color. It is also possible to arrange such that the value of the COUNT shown in FIG. 2 is directly outputted as the specific color proportion information signal 3. In such a case, the quantization unit 104 preferably employs a greater number of quantization tables so that a variety of combinations of quantization tables may be selected in accordance with the values of the specific color proportion information signal, whereby encoding is conducted with good balance between the compression ratio and the image quality.

Although the embodiment described hereinbefore in connection with FIG. 2 employs only one specific color, the invention does not exclude the use of a suitable greater number of specific colors. For instance, when a color image of a person against background is encoded, both the color of the skin and the color of the wear worn by the person may be specified as the specific colors. In such a case, the background data is compressed at a large compression ratio, while images of the face and wear of the person are reconstructed without noticeable degradation in the image quality.

Thus, the embodiment described hereinbefore provides an image encoding apparatus, as well as a method, in which quantization of the result of orthogonal transform of block data is conducted at quantization stepsizes corresponding to the result of count of the number of pixels contained in a predetermined color space region, offering advantages such as, for example, making image quality degradation less noticeable while achieving required high compression ratio.

The described encoding method can be used in various apparatuses which read image data through scanning, e.g., an image scanner, host computer, printer controller or a copying apparatus.

Second Embodiment

Figure 3:
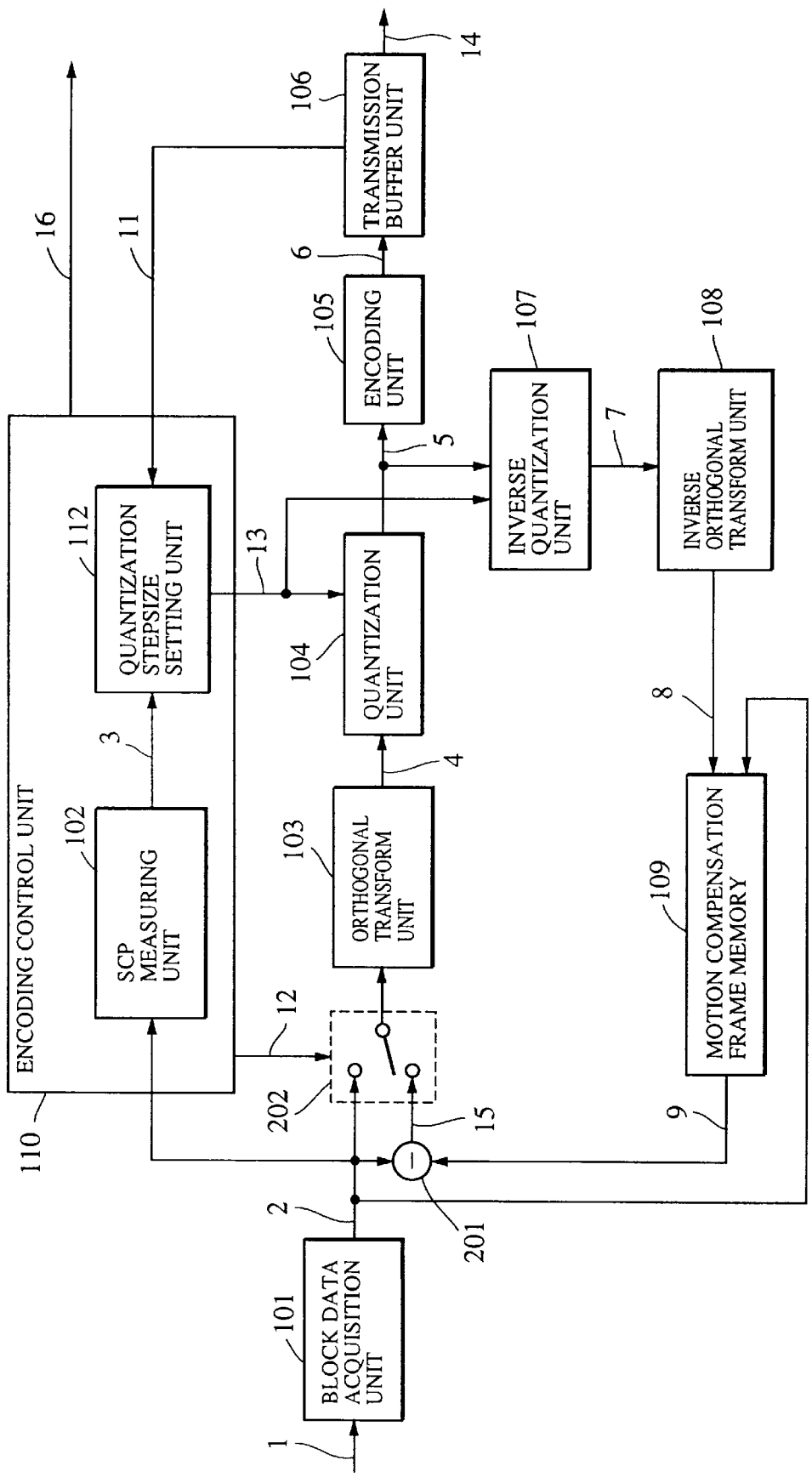
FIG. 3 is a block diagram showing the basic construction of a second embodiment of the image processing apparatus in accordance with the present invention.

A description will now be given of a second embodiment of the present invention. FIG. 3 is a block diagram showing the basic construction of a moving picture encoding section which is used in an image processing apparatus as the second embodiment. More specifically, the basic construction shown in FIG. 3 is basically the same as that of a moving picture encoding unit following ITu-T recommendation H. 261 but it further includes an SCP (Specific Color Proportion) measuring unit 102 which forms one of the critical feature of this embodiment. Components forming a loop filter, however, are omitted from the Figure for the clarification purpose.

In FIG. 3, numeral 101 denotes a block data acquisition unit which divides the color picture signal 1 received from, for example, a video camera into a plurality of block data each containing 8×8 pixels and rearranges such block data so as to produce output block data 2. It is assumed here that the block data 2 has N pixels, from first pixel to N-th pixel. The color picture signal 1 can be expressed with any suitable set of color components. The embodiment under description also can use any suitable set of color components, although in the following description the color picture signal 1 is expressed by using a luminance signal Y and color difference signals Cb, Cr. Each block data 2 is inputted to a subtracting device 201, switch 202, motion compensation frame memory, 109 and an SCP (Specific Color Proportion) measuring unit 102.

The subtracting unit 201 determines the difference between the block data 2 and reconstructed data 9 which has been outputted from the motion compensation frame memory 109, and produces difference data 15.

The switch 202 selects one of the block data 2 and the difference data 15 based on the prediction mode control signal 12 outputted from he encoding control unit 110 and delivers the selected signal to the orthogonal transform unit 103.

Transform coefficients 4 obtained through transformation by the orthogonal transform unit 103 are delivered to a quantization unit 104. The quantization unit 104 performs quantization with quantization stepsize 13 which is outputted from a quantization stepsize setting unit 112. The quantized data 5 thus obtained are delivered to an encoding unit 105 and an inverse quantization unit 107.

The encoding unit 105 encodes the quantized data 5 into variable-length codes 6.

A transmission buffer unit 106 temporarily stores the variable-length codes 6 inputted thereto and outputs transmission data 14 at a constant rate. The transmission buffer unit 106 produces a transmission buffer occupancy 11 which is indicative of the amount of the codes stored in the transmission buffer unit 106, and delivers it to the quantization stepsize setting unit 112.

The inverse quantization unit 107 performs inverse quantization of the quantized data 5 so as to produce a transform coefficients 7.

An inverse orthogonal transform unit 108 performs an inverse orthogonal transform of the transformation coefficients 7 so as to produce reconstructed data 8.

The motion compensation frame memory 109 performs motion compensation based upon the block data 2 and some of the reconstructed data 8, thus producing compensated reconstructed data 9.

The encoding control unit 110 performs various kinds of controls of encoding. In this embodiment, the encoding control unit 110 includes an SCP (Specific Color Proportion) measuring unit 102 which forms a feature of this embodiment.

Upon receipt of the block data 2, the SCP (Specific Color Proportion) measuring unit 102 measures the proportion of pixels having a specific color, and produces an SCP (Specific Color Proportion) information signal 3 which is indicative of the above-mentioned proportion and which is either "1" or "0". When the proportion is not less than a predetermined threshold, the SCP (Specific Color Proportion) information signal 3 is set to "1", whereas, when the proportion is below the threshold, the SCP information signal 3 is set to "0".

The SCP (Specific Color Proportion) information signal 3, which is output from the SCP (Specific Color Proportion) measuring unit 102, is input to the quantization stepsize setting unit 112.

The quantization stepsize setting unit 112 determines a temporary quantization stepsize based on the transmission buffer occupancy 11, using any suitable known determination method.

When the level of the SCP (Specific Color Proportion) information signal 3 is "1", i.e., when the proportion of the pixels having the specific color is not less than the threshold, a value which is obtained by subtracting a predetermined value from the temporary quantization stepsize is output as the quantization stepsize 13. Conversely, when the level of the SCP information signal 3 is "0", i.e., when the proportion of the pixels having the specific color is lees than the threshold, a value which is obtained by adding a predetermined value to the temporary quantization stepsize is outputted as the quantization stepsize 13.

Thus, in the case of the block in which the proportion of the specific color is large, a comparatively small quantization stepsize is used to suppress degradation of the quality at the block of the reconstructed image. In contrast, in the case of the block in which the proportion of the specific color is small, a comparatively large quantization stepsize is used so that the compression rate of this block is increased.

The encoding control unit 110 outputs encoding information 16 which includes information concerning the selected prediction mode, as well as information concerning quantization stepsize.

The processing performed by the SCP measuring unit 102 in this embodiment is substantially the same as that explained before in connection with FIG. 2 so that detailed description thereof is omitted.

As has been described, according to the present invention, a certain color space region is set to define the specific color, and the quantization stepsize is changed in accordance with color for each block, thus enabling control of the extent of degradation of quality of the reconstructed image. It is therefore possible to obtain a higher grade of evaluation of image quality by those who are looking at the reconstructed image.

For instance, when a color moving picture including an image of a person against a background is encoded, it is possible to effect encoding such that the face of the person is reconstructed with higher image quality than the background image. In addition, this advantageous effect is never affected by the motion of the person.

Third Embodiment

A third embodiment of the present invention will be described with reference to the accompanying drawings.

Figure 4:
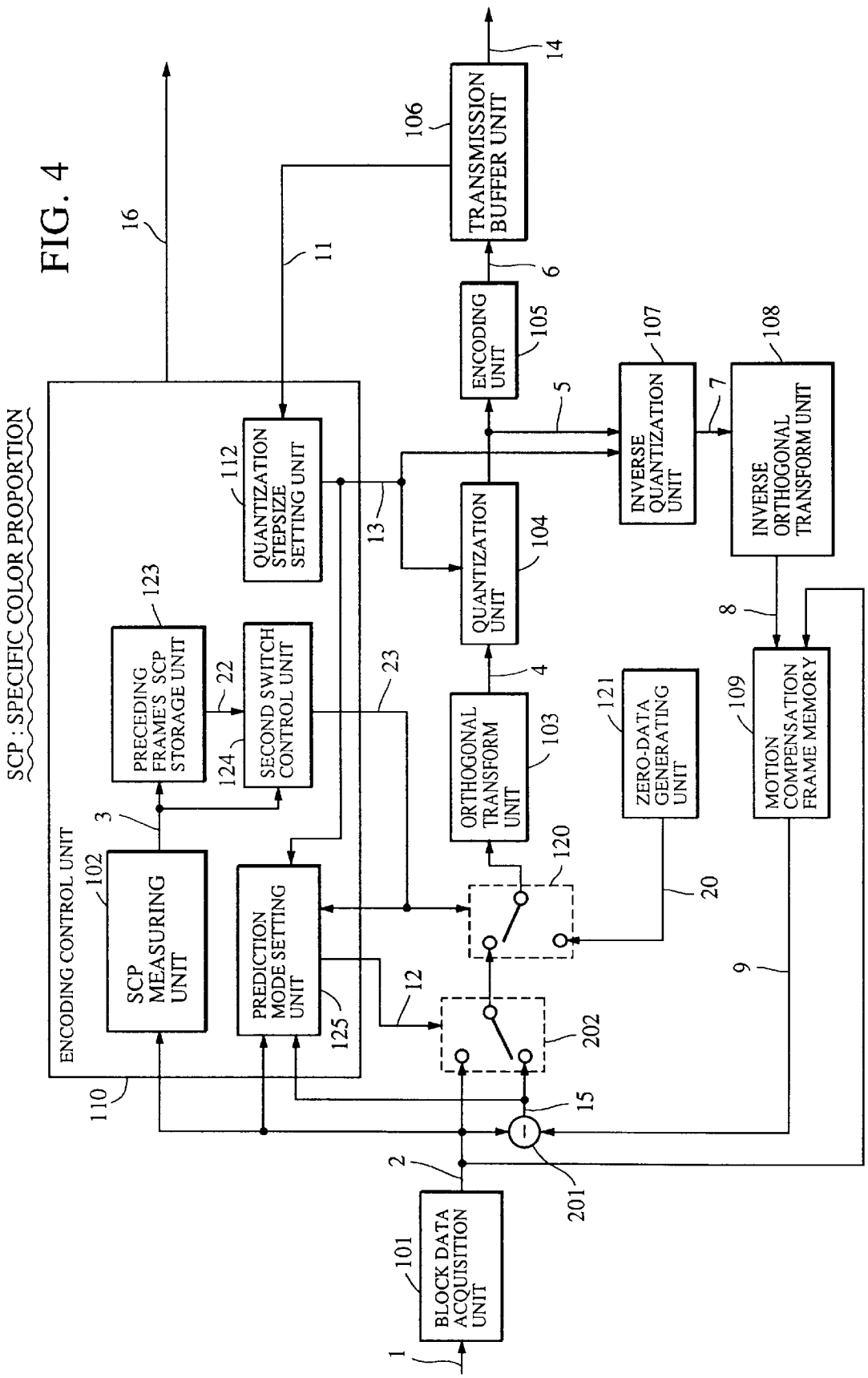
FIG. 4 is a block diagram showing the basic construction of a third embodiment of the image processing apparatus in accordance with the present invention.

FIG. 4 is a block diagram showing the basic construction of a moving picture signal encoding section in accordance with the third embodiment of the present invention.

The arrangement shown in FIG. 4 is basically the same as that of a moving picture signal encoding section following ITU-T recommendation H. 261, except that it includes a second switch 120, zero-data generating unit 121, SCP measuring unit 102, preceding frame's SCP storage unit 123 and a second switch control unit 124. Components forming a loop filter, however, are omitted from this Figure for the purpose of clarification.

In FIG. 4, numeral 101 denotes a block data acquisition unit which divides the color picture signal 1 received from, for example, a video camera into a plurality of block data each containing 8×8 pixels and rearranges such block data so as to produce output block data 2. It is assumed here that the block data 2 has N pixel, from first pixel to N-th pixel. The color picture signal 1 can be expressed with any suitable set of color components. The embodiment under description also can use any suitable set of color components, although in the following description the color picture signal 1 is expressed by using a luminance signal Y ant color difference signals Cb, Cr.

Block data 2 is delivered to a subtraction unit 201, first switch 202, motion compensation frame memory 109, prediction mode setting unit 125 and an SCP measuring unit 102.

The subtraction unit 201 determines the difference between the block data 2 and the reconstructed data 9 output from the motion compensation frame memory 109, thus outputting a difference data 15.

The first switch 202 selects one of the block data 2 and the difference data 15 based on a prediction mode control signal 12 which is outputted from the prediction mode setting unit 125, and delivers the selected data to the second switch 120.

The second switch 120 selects one of the outputted data from the first switch 202 and the zero-data 20 outputted from the zero-data generating unit 121 based on a second switch control signal 23 produce by the second switch control unit 124, and delivers the selected dada to the orthogonal transform unit 103.

The transform coefficients 4 transformed by the orthogonal transform unit 103 are inputted to the quantization unit 104 which performs quantization using quantization stepsizes 13 outputted front a quantization stepsize setting unit 112 so as to produce and deliver quantized data 5 to an encoding unit 105 and an inverse quantization unit 107.

The encoding unit 105 encodes the quantized data 5 into variable-length codes 6.

A transmission buffer unit 106 temporarily stores the variable-length codes 6 input thereto and delivers transmission data 14 at a constant rate. The transmission buffer unit 106 also outputs transmission buffer occupancy 11 which is delivered to the quantization stepsize setting unit 112.

The inverse quantization unit 107 performs inverse quantization of the quantized data 5 based on the quantization stepsize 13, so as to output transform coefficients 7. The inverse orthogonal transform unit 108 then effects inverse transform of the transform coefficients 7 so as to output reconstructed data 8.

The motion compensation frame memory 109 effects a motion compensation by using the block data 2 and some of the reconstructed data 8, thus producing compensated reconstructed data 9.

The encoding control unit 110 includes a prediction mode setting unit 125, quantization stepsize setting unit 112, SCP measuring unit 102, preceding frame's SCP storage unit 123 and a second switch control unit 124, and performs various kinds of controls.

The quantization stepsize setting unit 112 determines the quantization stepsize 13 based on the transmission buffer occupancy 11. The quantization stepsize setting unit 112 can receive various kinds of information in addition to the transmission buffer occupancy 11, so that it can determine the quantization stepsize in various ways.

Upon receipt of the block data 2, the SCP (Specific Color Proportion) measuring unit 102 measures the proportion of pixels having a specific color, and produces an SCP (Specific Color Proportion) information signal 3 which is indicative of the above-mentioned proportion and which is either "1" or "0". When the proportion is not less than a predetermined threshold, the SCP (Specific Color Proportion) information signal 3 is set to "1", whereas, when the proportion is below the threshold, the SCP information signal 3 is set to "0".

The SCP information signal 3 output from the SCP measuring unit 102 is input to the preceding frame's SCP storage unit 123 and the second switch control unit 124.

The preceding frame's SCP storage unit 123 stores SCP information signals 3 of a plurality of blocks corresponding to one frame, and delivers the stored signals on block basis as the preceding frame's SCP information signals 22 indicative of the proportion of the specific color in the preceding frame.

When the SCP information signal 3 or the preceding frame's SCP information signal 22 is "1", i.e., when the proportion of the specific color in the block of the frame which is being processed or the proportion of the specific color in the block of the preceding frame is not less than a predetermined value, a second switch control signal 23 is produced to enable the second switch 120 to select data output from the first switch 202. Conversely, when the SCP information signal 3 and the preceding frame's SCP information signal 22 are "0", i.e., when the proportion of the specific color in the block of the frame which is being processed and the proportion of the specific color in the block of the preceding frame are less than the predetermined value, the second switch control signal 23 is produced such as to enable the second switch 120 to select the zero data 20.

The prediction code setting unit 125 outputs prediction mode control signal 12 based on the block data 2, difference data 15 and the second switch control signal 23.

There are three types of prediction mode: INTRA mode, INTER mode and MC mode. When INTRA mode has been selected by the prediction mode setting unit 125, the first switch 202 is switched in accordance with the prediction mode control signal 12 so as to select the block data 2. When INTER or MC mode has been selected by the prediction mode setting unit 125, the first switch is changed-over by the prediction mode control signal 12 so s to select the difference data.

The encoding control unit 110 produces encoding information 16 which includes information concerning the selected prediction mode, as well as information concerning quantization stepsize.

The process performed by the SCP measuring unit 102 in this embodiment is not described because it is the same as that described before in connection with the flow chart shown in FIG. 2.

As will be seen from the foregoing description, according to the present invention, a certain color space is set as a specific color and the encoding processing is conducted with the inter-frame predicted error signal set to zero for any block which has a small proportion of the color contained in this color space, so that the efficiency of the encoding, i.e., rate of compression, can be further increased.

Fourth Embodiment

Figure 5:
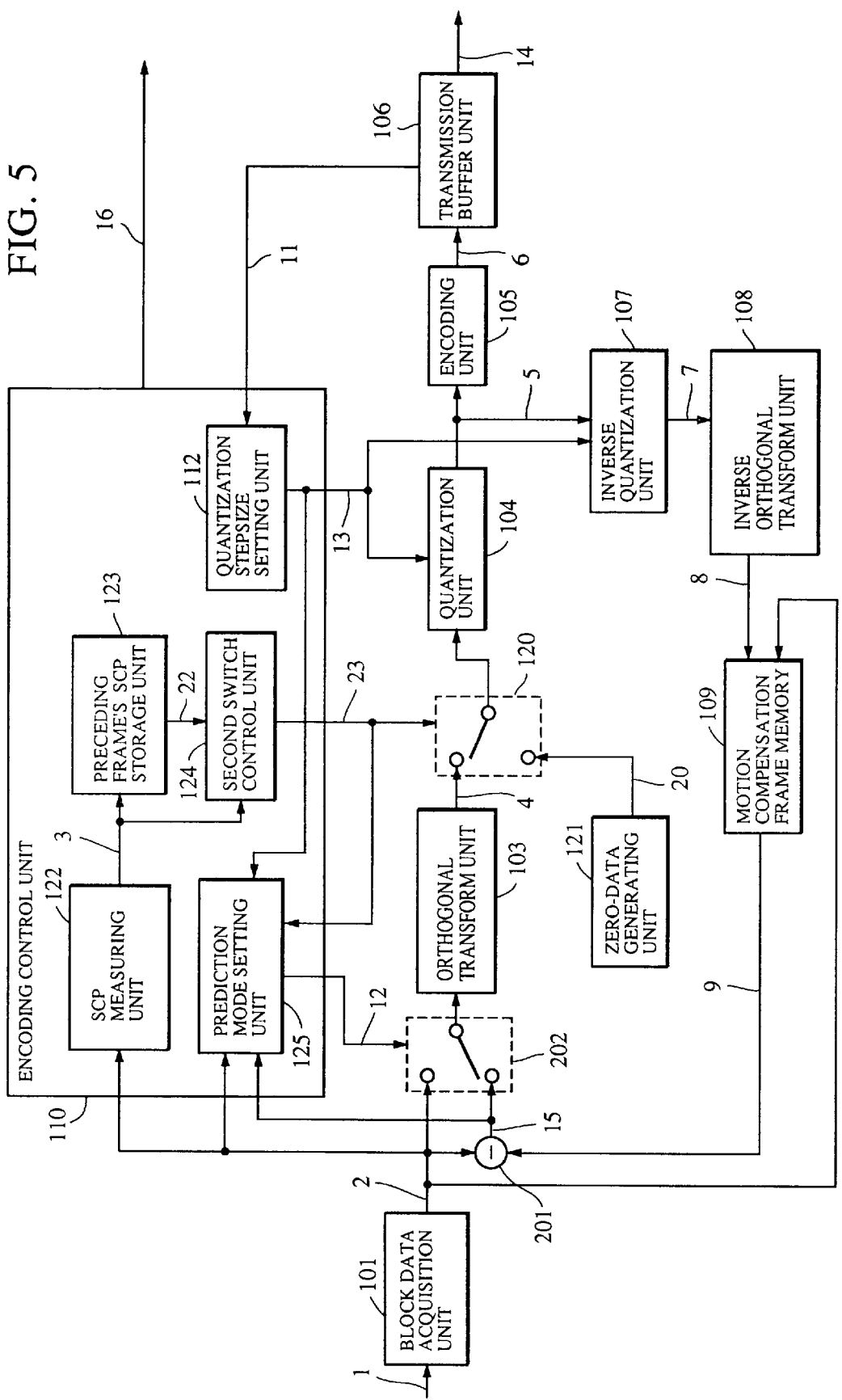
FIG. 5 is a block diagram showing the basic construction of a fourth embodiment of the image processing apparatus in accordance with the present invention.

FIG. 5 is a block diagram showing the construction of a moving picture signal encoding section in accordance with the fourth embodiment of the present invention.

This embodiment is characterized in that a second switch 120 similar to that of the third embodiment is connected between an orthogonal transform unit 103 and a quantization unit 104. Other portions are materially the same as those of the third embodiment and, therefore, not described.

Fifth Embodiment

Figure 6:
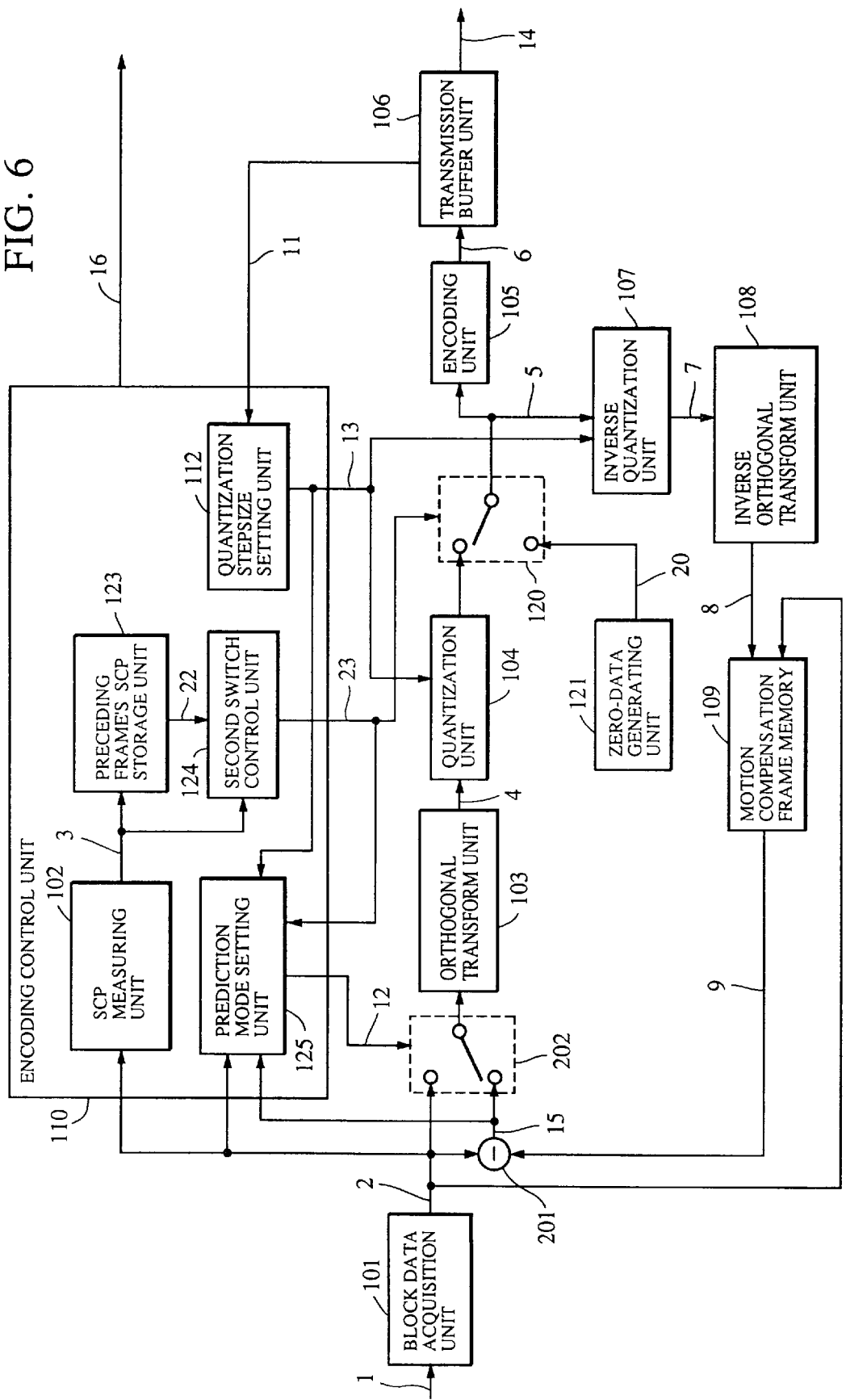
FIG. 6 is a block diagram showing the basic construction of a fifth embodiment of the image processing apparatus in accordance with the present invention.

FIG. 6 is a block diagram showing the construction of a moving picture signal encoding section in accordance with the fifth embodiment of the present, invention.

This embodiment is characterized in that, a second switch 120 similar to that of the third embodiment is connected between an a quantization unit 104 and an encoding unit 105. Other portions are materially the same as those of the third embodiment and, therefore, not described.

A description will now be given of a method by which the user appoints the specific color to be used in the SCP measuring unit 123 in the described embodiments, with reference to FIGS. 7 and 8.

Figure 7:
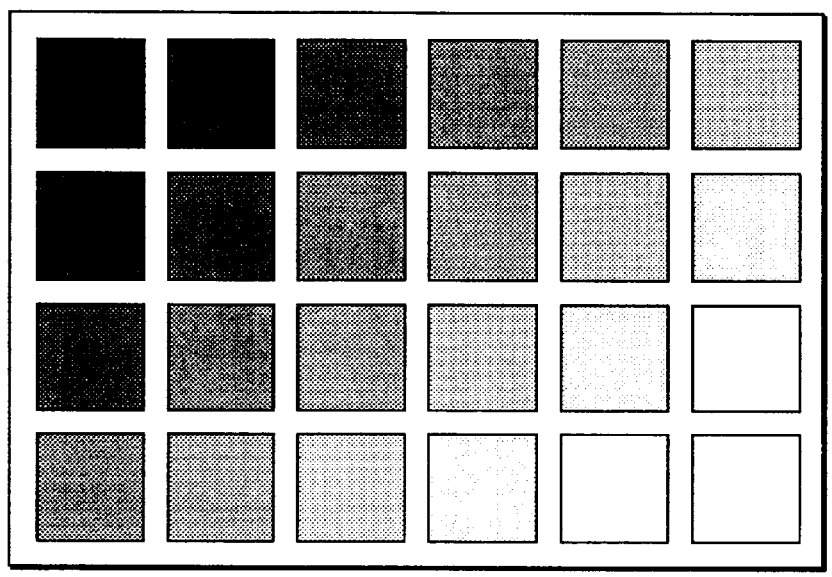
FIG. 7 is an illustration of a display for enabling a user to appoint a specific color using a color palette.

FIG. 7 illustrates an example of a display frame for enabling the user to appoint a specific color by using a color palette.

Using a pointing device such as a mouse or a tablet which is not shown, the user can select any one of the color panel in the color palette displayed on the display frame. The color difference signals of the selected color panel are represented by Cbth0, Crth0. The threshold values Cbth1, Cbth2, Crth1, Crth2 of the color difference signals discussed before in connection with FIG. 2 are determined by the following formulae:

$$Cbth1 = Cbth0 - Cbw$$

$$Cbth2 = Cbth0 + Cbw$$

$$Crth1 = Crth0 - Crw$$

$$Crth2 = Crth0 + Crw$$

Values of Cbw and Crw are beforehand determined by a suitable method.

Figure 8:
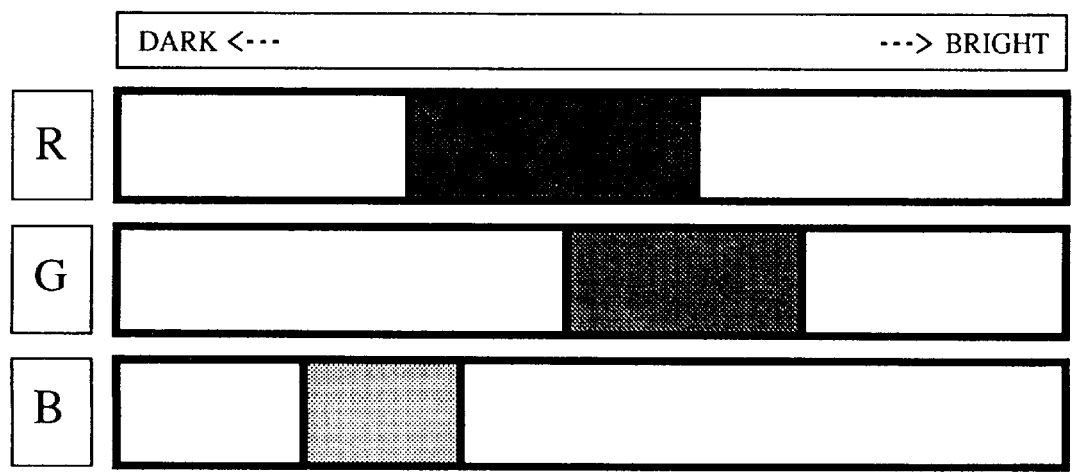
FIG. 8 is an illustration of a display for enabling the user to appoint a specific color using tri-color bars of R (red), G (green) and B (blue).

FIG. 8 shows an example of a display frame for enabling the user to appoint a specific color using tri-color bars of R (red), G (green) and B (blue).

The user can select position and width of a region on each color bar by means of a pointing device such as a mouse or a tablet which is not shown. In FIG. 8, the left ends of the regions shown by halftone on the respective color bars indicate the first threshold values Rth1, Gth1 and Bth1, while the right ends of the same indicate the second threshold values Rth2, Gth2 and Bth2.

The first threshold values Cbth1 and Crth1 of the color difference signals shown in FIG. 2 can be obtained by transforming the threshold values Rth1, Gth1 and Bth1, whereas the second threshold values Cbth2 and Crth2 are determined by transforming the threshold values Rth2, Gth2 and Bth2.

The transformation from R, G, B signals to Y, Cb, Cr signals is determined by, for example, ITU-R recommendation 601-2.

The arrangement may be such that the color bars R, G, B shown in FIG. 8 are substituted by color bars of Cb and Cr signals, so as to enable direct appointment of the color difference signal threshold values Cbth1, Cbth2, Crth1, Crth2.

As has been described, according to the third to fifth embodiments of the present invention, a certain color space is predetermined to define a specific color, and encoding is conducted for blocks containing small proportions of the specific color in which the inter-frame prediction error signals are set to 0s (zeroes), thus drastically reducing the amount of codes assigned to the blocks, whereas, for the blocks which have large proportions of the specific color, amount of the codes assignments is increased, whereby degradation of reconstructed image quality is greatly suppressed in the region of the blocks.

For instance, when a moving color image of a person against a background is encoded, the color of the skin of the person is determined as the specific color, so that encoding of the background region is conducted only in several frames from the beginning, and only the image region corresponding to the person is encoded in subsequent frames, whereby degradation of reconstructed image quality of the person is greatly suppressed. This advantageous effect is never impaired by the motion of the person.

The present invention may be applied to a system composed of a plurality of component devices or to an apparatus which consists of only one device. It will be obvious that the invention can be achieved by supplying a program to such a system or apparatus.

Although the invention has been described through its specific forms, it is to be understood that the described embodiments are not exclusive and various changes and modifications may he imparted thereto without departing from the scope of the invention which is limited solely by the appended claims.

The invention may employ two or more specific colors, instead of only one specific color.

It is also possible to use color spaces such as (R, G, B) type color space or (L*, a*, b*) type color space, in place of the (Y, Cb, Cr) type color space used in the described embodiments.

As has been described, according to the present invention, a certain color space is set as a specific color and the mode of the coding control is suitably selected based on the proportion of the specific color, whereby degradation of the quality of reconstructed image is suppressed while achieving the required level of compression rate, thus enabling the reconstructed image to be more highly evaluated by those who look at the reconstructed image.

What is claimed is:

1. An image processing apparatus comprising:

input means for inputting color image data comprised of a plurality of color component data;

quantizing means for quantizing the color image data on the basis of a quantization parameter that determines a degree of compression of the color image data, wherein said quantizing means adaptively controls the quantization parameter based on whether a color image expressed by the color image data has a predetermined color; and encoding means for encoding the color image data quantized by said quantizing means.

2. An apparatus according to claim 1, wherein said input means includes dividing means for dividing the color image data into a plurality of blocks, each having a plurality of pixels, and said quantizing means includes orthogonal transforming means for orthogonally transforming the color image data in the block and quantizing the color image data transformed by said orthogonal transforming means.

3. An apparatus according to claim 2, wherein the plurality of color component data include luminance component data and chrominance component data.

4. An apparatus according to claim 3, wherein said quantizing means includes detecting means for detecting whether the color image has the predetermined color based on the chrominance component data.

5. An apparatus according to claim 4, wherein said input means inputs image data relating to a plurality of frames successively.

6. An apparatus according to claim 5, further comprising extracting means for extracting prediction error data from the plurality of frames.

7. An apparatus according to claim 6, further comprising correcting means for correcting the prediction error data based on the detection result of said detecting means.

8. An apparatus according to claim 5, further comprising memory means for storing the detection result of a previous frame detected by said detecting means.

9. An image processing method comprising the steps of:

inputting color image data comprised of a plurality of color component data;

quantizing the color image data on the basis of a quantization parameter that determines a degree of compression of the color image data, wherein the quantization parameter is adaptively controlled based on whether a color image expressed by the color image data has a predetermined color; and encoding the color image data quantized in said quantizing step.

10. An image processing apparatus comprising:

input means for inputting color image data including a plurality of color component data;

setting means for setting a predetermined color range externally; and encoding means for encoding the color image data block by block, each block having a plurality of pixels, said encoding means including quantizing means for quantizing the color image data on the basis of a quantization parameter, wherein said encoding means adaptively controls an amount of encoded color image data produced by encoding based on whether the color component data falls within the predetermined color range to thereby indicate that a color image expressed by the color image data has a predetermined color, said encoding means controlling the amount of encoded color image data by controlling the quantization parameter.

11. An image processing apparatus according to claim 10, wherein said color image data have a luminance component and a chrominance component.

12. An image processing apparatus according to claim 10, wherein said encoding means performs orthogonal transformation and quantization on the color image data.

13. An image processing apparatus according to claim 10, wherein the amount of encoded color image data is further controlled based on the amount of encoded color image data stored in a memory.

14. An image processing method comprising the steps of:

inputting color image data including a plurality of color component data;

setting a predetermined color range externally; and encoding the color image data block by block, each block having a plurality of pixels, said encoding step including quantizing the color image data on the basis of a quantization parameter, wherein said encoding step adaptively controls an amount of encoded color image data produced by encoding based on whether the color component data fall within the predetermined color range to thereby indicate that a color image expressed by the color image data has a predetermined color, said encoding step controlling the amount of encoded color image data by controlling the quantization parameter.

15. An image processing apparatus comprising:

input means for inputting color image data;

dividing means for dividing the color image data into a plurality of blocks, each having a plurality of pixels;

quantizing means for quantizing the color image data on the basis of a quantization parameter that determines a degree of compression of the color image data;

encoding means for encoding the color image data quantized by said quantizing means; and controlling means for adaptively controlling the quantization parameter based on a proportion of pixels contained in a predetermined color space region of each block to thereby indicate that a color image expressed by the color image data has a predetermined color.

16. An image processing method comprising the steps of:

inputting color image data;

dividing the color image data into a plurality of blocks, each having a plurality of pixels;

quantizing the color image data on the basis of a quantization parameter that determines a degree of compression of the color image data;

encoding the color image data quantized by said quantizing means; and adaptively controlling the quantization parameter based on a proportion of pixels contained in a predetermined color space region of each block to thereby indicate that a color image expressed by the color image data has a predetermined color.

17. An image processing apparatus comprising:

input means for inputting data including a plurality of color component data; and encoding means for encoding the image data by using inter-picture encoding, said encoding means including controlling means for controlling inter-picture predicted error data to zero based on whether the color component data fall within a predetermined range.

18. An image processing apparatus comprising:

input means for inputting color image data;

dividing means for dividing the color image data into a plurality of blocks each block having a plurality of pixels; and encoding means for encoding the image data by using inter-picture encoding, said encoding means including controlling means for controlling inter-picture predicted error data to zero based on a proportion of pixels which are contained in a predetermined color space region in a block.

19. An image processing method comprising the steps of:

inputting image data including a plurality of color component data; and encoding the image data by using inter-picture encoding, said encoding step including a controlling step of controlling inter-picture predicted error data to zero based on whether the color component data fall within a predetermined range.

20. An image processing method comprising the steps of:

inputting color image data;

dividing the color image data into a plurality of blocks, each having a plurality of pixels; and encoding the image data by using inter-picture encoding, said encoding step including a controlling step of controlling inter-picture predicted error data to zero based on a proportion of pixels which are contained in a predetermined color space region in a block.

21. An image processing apparatus comprising:

input means for inputting color image data comprised of a plurality of color component data;

quantizing means for quantizing the color image data based on a quantization step size, wherein the quantization step size determines a degree of compression of the color image data; and controlling means for adaptively controlling the quantization step size based on whether a color image expressed by the color image data has a predetermined color.

22. An apparatus according to claim 21, further comprising an encoding means for encoding the color image data quantized by said quantizing means.

23. An apparatus according to claim 22, wherein said encoding means has an intra-picture encoding mode and an inter-picture encoding mode.

24. An apparatus according to claim 22, further comprising storing means for storing the color image data encoded by said encoding means.

25. An apparatus according to claim 24, wherein said control means controls the quantization step size based on a capacity of said storing means.

26. An image processing method comprising the steps of:

inputting color image data comprised of a plurality of color component data;

quantizing the color image data based on a quantization step size, wherein the quantization step size determines a degree of compression of the color image data; and adaptively controlling the quantization step size based on whether a color image expressed by the color image data has a predetermined color.

27. An image processing method comprising the steps of:

inputting color image data comprised by a plurality of color component data;

quantizing the color image data on the basis of a quantization step size, wherein the quantization step size determines a degree of compression of the color image data; and adaptively controlling the quantization step size based on whether a color image expressed by the color image data has a predetermined color.

* * * * *

UNITED STATES PATENT AND TRADEMARK OFFICE
CERTIFICATE OF CORRECTION

PATENT NO.   :   6,075,619

DATED        :   June 13, 2000

INVENTOR(S)  :   YOSHIO IIZUKA

It is certified that error appears in the above-identified patent and that said Letters Patent is hereby corrected as shown below:

ON COVER PAGE AT [57] ABSTRACT

Line 5, "into" should read --into a--;
  Line 10, "a" should be deleted.

COLUMN 1

Line 12, "to" should read --to an--;
  Line 19, "still" should read --a still--;
  Line 25, "on" should read --on a-- and "of" should read --of the--;
  Line 28, "amounts" should read --amount--.

COLUMN 2

Line 20, "to" should read --to a--.

COLUMN 4

Line 8, "3." should read --3--;
  Line 13, close up right margin;
  Line 14, close up left margin;
  Line 22, "$(n \leq N)$," should read --$(n<N)$,--;
  Line 23, "be" should read --by--;
  Line 32, "(COUNT > COUNTth)," should read --(COUNT < COUNTth),-;
  Line 39, "Stepsizes" should read --stepsizes--.

UNITED STATES PATENT AND TRADEMARK OFFICE
CERTIFICATE OF CORRECTION

PATENT NO. : 6,075,619

DATED : June 13, 2000

INVENTOR(S) : YOSHIO IIZUKA

It is certified that error appears in the above-identified patent and that said Letters Patent is hereby corrected as shown below:

COLUMN 5

Line 35, "of" (first occurrence) should read --of a--;
   Line 53, "feature" should read --features--.

COLUMN 6

Line 2, "memory, 109" should read --memory 109--;
   Line 10, "he" should read --the--;
   Line 30, "a" should be deleted.

COLUMN 7

Line 53, "pixel," should read --pixels,--.

COLUMN 8

Line 9, "dada" should read --data--.

COLUMN 9

Line 21, "so s" should read --so as--;
   Line 50, "present," should read --present--;
   Line 51, "that," should read --that--;
   Line 53, "an" (first occurrence) should be deleted.

COLUMN 10

Line 11, "beforehand determined" should read --determined beforehand--.

UNITED STATES PATENT AND TRADEMARK OFFICE
CERTIFICATE OF CORRECTION

PATENT NO.   : 6,075,619
DATED        : June 13, 2000
INVENTOR(S)  : YOSHIO IIZUKA It is certified that error appears in the above-identified patent and that said Letters Patent is hereby corrected as shown below:

COLUMN 11

Line 11, "of" should read --of the--.

Signed and Sealed this

Twenty-second Day of May, 2001

*Attest:*

NICHOLAS P. GODICI

*Attesting Officer*   *Acting Director of the United States Patent and Trademark Office*